…

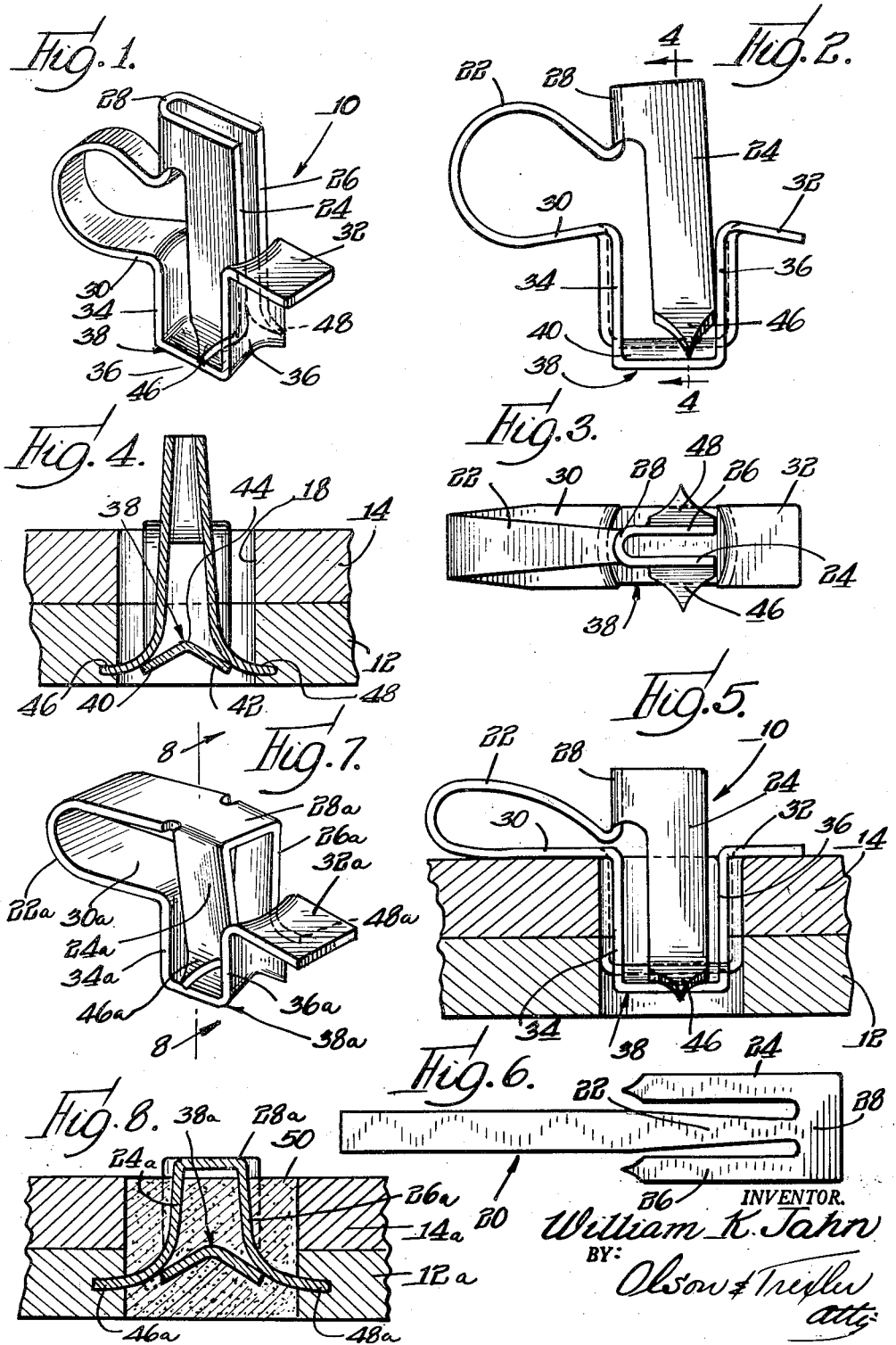

United States Patent Office

2,779,229
Patented Jan. 29, 1957

2,779,229

BLIND SHEET METAL DRIVE FASTENER HAVING LATERALLY DEFORMABLE PRONG MEANS

William K. Jahn, Elgin, Ill., assignor to Illinois Tool Works, Chicago, Ill., a corporation of Illinois Application February 2, 1955, Serial No. 485,704

7 Claims. (Cl. 85—11)

The present invention relates to novel fastening devices and more particularly, to novel fastening devices adapted to be applied to apertured work means from one side of the work means.

Many occasions arise where it is desired to secure an apertured panel to another apertured panel or a support structure or to secure various articles to an apertured panel, but where the back side of the apertured panel is relatively inaccessible so that a fastening member may be applied only from the front side. Furthermore, it is often desirable to have a fastening member which may be applied to an apertured workpiece from one side thereof but which will not project beyond or mar the opposite side of the workpiece. Various fastening devices have heretofore been proposed for use in situations of the above described type. However, such fastening devices have not always been satisfactory since they are often unduly complicated and expensive to manufacture or relatively difficult to apply to the work or insufficiently rugged to be attached to the work with the desired security for some purposes.

An important object of the present invention is to provide a novel sheet material fastening device which is of simple and economical construction and which may be easily applied to and securely connected with an apertured panel or workpiece from one side of the panel.

A more specific object of the present invention is to provide a novel one piece sheet material fastener of the above described type which includes prongs adapted to be embedded in the wall of a workpiece aperture for securing the fastener to the workpiece and which includes a novel and rugged anvil section against which the prongs may be driven with considerable force for causing deflection of the prongs into impinging engagement with the workpiece.

Other objects and advantages of the present invention will become apparent from the following description and the accompanying drawings wherein:

Fig. 1 is a perspective view showing a novel fastening device embodying the preferred form of the present invention;

Fig. 2 is an elevational view of the fastening device of this invention;

Fig. 3 is a plan view of the novel fastening device;

Fig. 4 is a sectional view of the fastening device taken along line 4—4 in Fig. 2 with the fastening device applied to a work assembly;

Fig. 5 is a partial sectional view showing the novel fastening device applied to a work assembly;

Fig. 6 is a plan view of a one piece sheet material blank from which the fastening device of Figs. 1 through 5 may be formed;

Fig. 7 is a perspective view showing a modified form of the present invention; and Fig. 8 is a sectional view of the fastening device taken along line 8—8 in Fig. 7 with the fastening device applied to a work assembly.

Referring now more specifically to the drawings wherein like parts are designated by the same numerals throughout the various figures, a fastening device 10 embodying the preferred form of the present invention is shown in Figs. 1 through 5. As shown in Figs. 4 and 5, the fastening device 10 is adapted to connect workpieces 12 and 14 having apertures 16 and 18 therein, which workpieces may be panels or various apertured articles, or combinations thereof.

In Fig. 6 there is shown a blank from which the fastening device 10 is made, which blank includes an elongated body or strip 20 of substantially uniform width throughout its length. A portion 22 joins the strip and may be tapered as shown, and a pair of prongs 24 and 26 is joined to the portion 22 by a section 28.

As shown in Figs. 1 through 5, the fastener blank which is preferably made from sheet metal is formed so that the elongated strip or body 20 is provided with a first portion adapted to be inserted into the apertures in the workpieces and a second portion including sections 30 and 32 adapted to overlie one surface of the work assembly. The first mentioned portion of the strip 20 is generally U-shaped and includes leg sections 34 and 36 extending generally axially from the sections 30 and 32, and a transverse or bottom section 38. The section 38 serves as an anvil in the manner described below and, therefore, opposite sides 40 and 42 of the anvil section are inclined or flared from a common bend line 44 so that the anvil section has an inverted generally V-shaped transverse cross section. Thus, the anvil section is formed for deflecting the prongs in the manner described below. It is also important to note that the generally V-shaped formation of the anvil section in combination with the fact that opposite ends of the anvil section merge with the legs 34 and 36 along generally V-shaped junction lines provides the anvil section with great strength and rigidity so as to insure proper deflection of the prongs when the prongs are struck against the anvil section in the manner described below. Additional strength and ruggedness may be imparted to the U-shaped portion by forming the leg sections 34 and 36 with arcuate transverse cross sections in the manner shown.

The prongs 24 and 26 provide a deformable stud section for securing the fastener device to the work. In order to position the prongs for entry into the work means aperture, the portion 22 is looped or reversely bent as shown in Figs. 1 and 2 so as to overlie the section 30 of the head portion of the fastener, and the section 28 is formed so that it extends generally axially outwardly. It should be noted that the prongs are joined to the section 28 along generally axially extending margins of the section and are folded so as to be disposed in opposing relationship with respect to each other. Furthermore, as shown best in Fig. 3, the upper ends of the prongs and the section 28 combine to provide a generally U-shaped head for the stud section which is sufficiently rugged to withstand hammer blows or the like during application of the fastening device to the work.

The deformable prongs 24 and 26 are provided with oppositely flaring pointed tips 46 and 48, and as shown best in Fig. 3, the fastener is formed so that the distance between the ends of these tips is not greater than the length of the anvil section and more particularly, is not greater than the diameter of the workpiece apertures. Thus, initial assembly of the fastening device with the workpieces may be easily accomplished merely by inserting the anvil section and the tips of the prongs into the workpiece apertures until the sections 30 and 32 of the fastener device head portion engage the outer surface of the work assembly. Thereafter complete assembly of the fastening device is accomplished merely by striking the head section of the prongs with a hammer or similar tool so that the flared tips of the prongs are forced against and deflected by the anvil section 38. This causes the prongs to be deformed laterally in opposite directions so that the tips thereof are driven into the wall of the workpiece aperture, which workpiece is, of course, formed from wood, hardboard, or any other material into which the prongs may be driven. Figs. 4 and 5 show the fastener member after the prongs have been deformed so that the tips thereof are embedded in the work. It should be noted that the tips of the prongs flare away from the head portion sections 30 and 32 so that as the prongs are driven into the work, the head portion sections are drawn tightly against the outer surface of the work assembly. Furthermore, the head portion sections 30 and 32 are preferably initially inclined with respect to the axis of the fastener in the manner shown in Fig. 2 so that as they are drawn against the outer surface of the work assembly, they may flex outwardly so as to insure tight gripping or clamping of the workpieces between the head portion sections and the tips of the prongs. It should be further noted that neither the anvil section nor the tips of the prong project beyond the back or under surface of the workpiece 12 so that this surface is left unmarred.

In Figs. 7 and 8 there is shown a modified form of the present invention which is similar to the above described embodiment as indicated by the application of identical reference numerals with the suffix "a" added to corresponding elements. This embodiment differs from the above described structure in that the section 28a extends generally transversely of the fastener rather than generally axially, and the prongs join transversely extending margins of the section 28a. This arrangement somewhat simplifies the dies for manufacturing the fastener, but requires stock material of greater width than the fastener described above. Another advantage of the fastening device shown in Figs. 7 and 8 is that the portion 22a and the section 28a may be flattened so that they do not project substantially above the surface of the work assembly.

In many instances it is desirable to seal the apertures through the workpieces against the passage of air, moisture, fumes, dust and the like. This may be accomplished by casting or otherwise forming a body 50 of pliable sealing material around the axially extending legs and anvil sections of the fastening devices. Then when the prongs are driven over the anvil and into the work, the sealing compound is forced to flow into all cracks and crevices within the apertures to effect complete sealing of the apertures. While for purposes of illustration the body 50 of sealing compound is shown only in Fig. 8, it is understood that the body of sealing compound is to be applied to the fastener of Fig. 7 before the fastener is assembled with the work. In addition, it should be understood that the body of sealing compound may also be applied to the fastener shown in Figs. 1 through 5, if desired.

From the above description, it is seen that the present invention has provided a novel one piece sheet material or sheet metal fastening device which may easily be applied to a blind aperture in work means. More specifically, it is seen that the present invention has provided a novel fastener which is of simple and economical construction and which is also relatively rugged so as to effect a secure connection between the workpieces. It will also be appreciated that the present invention has provided a novel fastener which is appliable to a work assembly from one side thereof without projecting beyond the opposite side of the assembly while at the same time, the aperture in the work assembly may be effectively sealed.

While the preferred embodiments of the present invention have been shown and described herein, it is obvious that many structural details may be changed without departing from the spirit and scope of the appended claims.

The invention is claimed as follows:

1. A blind fastener for application to apertured work means having a predetermined thickness comprising a sheet material body including a portion for insertion into an aperture of a work means, a second portion for overlying one side of the work means when said first portion is positioned within said aperture, said first portion being generally U-shaped and including opposed legs extending axially from and joining to said second portion and an anvil section spaced axially from said second portion a distance less than said predetermined thickness and providing the bottom of the U for traversing said aperture when positioned therein, and deformable prong means integrally innerconnected with said second portion and extending for entry into said aperture from said one side of the work means and for engagement with said anvil section and adapted on driving thereof against said anvil section to be deformed laterally for impinging a wall of said aperture to secure the fastener to said work means.

2. A blind fastener, as defined in claim 1, wherein said anvil section includes oppositely disposed portions angularly arranged with respect to each other and joined along a common bend line and flaring away from said second portion, and wherein said prong means includes a plurality of elements respectively engageable with said angularly arranged portions.

3. A blind fastener for application to apertured work means comprising a sheet material body including a portion for insertion into an aperture of the work means, a second portion for overlying one side of the work means when said first portion is positioned within said aperture, said first portion including an anvil section axially offset from one side of said second portion and disposed for traversing said aperture when positioned therein, a reversely bent portion having an end integral with said second portion, an intermediate section extending over said second portion and an opposite end section extending at an angle with respect to and from said intermediate section and also extending substantially axially outwardly with respect to and away from said second portion at a side thereof opposite from said anvil section, and deformable prong means integrally joined with generally axially extending margins of said last named end section and extending substantially axially for entry into said aperture from said one side of the work means and for engagement with said anvil section and adapted on driving thereof against said anvil section to be deformed laterally for impinging a wall of said aperture to secure the fastener to said work means.

4. A blind fastener for application to apertured work means having a predetermined thickness comprising a sheet material body including a portion for insertion into an aperture of the work means, a second portion for overlying one side of the work means when said first portion is positioned within said aperture, said first portion including a generally U-shaped strip of substantially uniform width having opposed leg sections extending axially from and joining separate sections of said second portion and having an anvil section spaced axially from said second portion a distance less than said predetermined thickness providing the bottom of the U between said opposed leg sections of the U, and deformable prong means integrally innerconnected with said second portion and extending for entry into said aperture from said one side of the work means and for engagement with said anvil section and adapted on driving thereof against said anvil section to be deformed laterally for impinging a wall of said aperture to secure the fastener to said work means.

5. A blind fastener, as defined in claim 4, wherein said anvil section has an inverted generally V-shaped transverse cross section, and said prong means includes a pair of pointed elements engageable with opposite sides of the V-shaped anvil section so that they will be deformed laterally in opposite direction for impinging the points thereof against opposite sides of the aperture.

6. A blind fastener, as defined in claim 5, wherein said pointed elements have pointed free end portions flaring away from each other and away from said separated sections of said second portion, and wherein said separated sections are inclined with respect to each other and toward the free ends of the prong elements, whereby to promote secure clamping of the work means between said separated sections and said flared ends of the prong elements.

7. A blind fastener for application to apertured work means having a predetermined thickness comprising a sheet material body including a portion for insertion into an aperture in the work means, a second portion for overlying one side of the work means when said first portion is positioned within said aperture, said first portion being generally U-shaped and including opposed legs extending axially from and joined to said second portion and an anvil section providing the bottom of the U and axially spaced from said second portion a distance less than said predetermined thickness, deformable prong means integrally innerconnected with said second portion and extending for engagement with said anvil section and adapted upon driving thereof against the anvil section to be deformed laterally for impinging a wall of said aperture to secure the fastener to said work means, and a body of pliable sealing material surrounding said first portion and insertable therewith into said aperture means and adapted to flow and fill any crevices within the aperture means while said prong means is being deformed.

References Cited in the file of this patent

UNITED STATES PATENTS

| 1,204,330 | Adair | Nov. 6, 1916 |
| 1,237,142 | Aase | Aug. 14, 1917 |
| 1,263,219 | Fischer | Apr. 16, 1918 |
| 2,222,338 | Roberts | Nov. 19, 1940 |
| 2,404,245 | Olsen | July 16, 1946 |
| 2,513,105 | Poupitch | June 27, 1950 |
| 2,597,344 | Lang | May 20, 1952 |